United States Patent
Gatter

(10) Patent No.: US 11,023,674 B2
(45) Date of Patent: Jun. 1, 2021

(54) GENERATION AND APPLICATION OF OBJECT NOTATION DELTAS

(71) Applicant: SAP SE, Walldorf (DE)

(72) Inventor: Juergen Gatter, Rauenberg (DE)

(73) Assignee: SAP SE, Walldorf (DE)

( * ) Notice: Subject to any disclaimer, the term of this patent is extended or adjusted under 35 U.S.C. 154(b) by 15 days.

(21) Appl. No.: 16/661,626

(22) Filed: Oct. 23, 2019

(65) Prior Publication Data

US 2021/0124799 A1   Apr. 29, 2021

(51) Int. Cl.
*G06F 40/205* (2020.01)
*G06F 16/93* (2019.01)

(52) U.S. Cl.
CPC ............ *G06F 40/205* (2020.01); *G06F 16/93* (2019.01)

(58) Field of Classification Search
None
See application file for complete search history.

(56) References Cited

U.S. PATENT DOCUMENTS

| | | | |
|---|---|---|---|
| 9,002,876 B2 | 4/2015 | Gatter | |
| 9,280,449 B2 | 3/2016 | Roegelein et al. | |
| 9,753,700 B2 | 9/2017 | Rath et al. | |
| 9,811,579 B1* | 11/2017 | Olson | G06F 16/284 |
| 9,927,951 B2 | 3/2018 | Gatter et al. | |
| 9,946,535 B2 | 4/2018 | Rath et al. | |
| 2004/0268230 A1* | 12/2004 | Liu | G06F 40/103 |
| | | | 715/201 |
| 2014/0164388 A1* | 6/2014 | Zhang | G06F 16/322 |
| | | | 707/742 |
| 2015/0269146 A1* | 9/2015 | Ayyar | G06Q 10/101 |
| | | | 707/608 |
| 2015/0379957 A1 | 12/2015 | Roegelein et al. | |
| 2016/0274867 A1* | 9/2016 | Narayanan | G06F 8/33 |
| 2016/0350084 A1* | 12/2016 | Waggoner | G06F 8/34 |

(Continued)

OTHER PUBLICATIONS

Bourhis et al., "JSON: Data model, Query languages and Schema specification," PODS'17, May 14-19, 2017, Chicago, IL, USA, copyright 2017 ACM, p. 123-135. (Year: 2017).*

(Continued)

*Primary Examiner* — Amelia L Tapp
(74) *Attorney, Agent, or Firm* — Fish & Richardson P.C.

(57) ABSTRACT

The present disclosure involves systems, software, and computer implemented methods for creating and merging delta object notation documents. One example method includes receiving a request to create a delta object notation document based on a first object notation document and a second object notation document. The first object notation document is compared to the second object notation document to generate the delta object notation document in an object notation format. Generating the object notation document includes navigating properties in the first object notation document and the second object notation document to identify properties in the first object notation document and the second object notation document and determining, for each property identified in the first object notation document or the second object notation document, whether a property with a same name and parent exists in a corresponding first object notation document or a corresponding second object notation document.

19 Claims, 13 Drawing Sheets

(56) References Cited

U.S. PATENT DOCUMENTS

2018/0225731 A1    8/2018  Gatter
2018/0246899 A1*  8/2018  Natchu .................. G06F 16/93
2019/0354616 A1*  11/2019  Baker ................ G06F 16/2379

OTHER PUBLICATIONS

"JSON-delta by example", JSON delta 2.0 documentation, captured Dec. 26, 2018 by web.archive.org, retrieved from https://json-delta.readthedocs.io/en/latest/philosophy.html, 3 pages. (Year: 2018).*
U.S. Appl. No. 16/661,626, filed Oct. 23, 2019, Gatter.
Json Lint, "The JSON Validator" created on Jan. 16, 2008, [retrieved on Oct. 28, 2019], Retrieved from : URL <https://jsonlint.com/>, 2 pages.
Bryan et al., "JavaScript Object Notation (JSON) Patch." RFC 6902 Proposed Standard, Apr. 2013, 36 pages.

* cited by examiner

| JSONs | CONTENT |
|---|---|
| \multicolumn{2}{c}{Example 1 – Equal Content 202} | |
| JSON1: 204 | {"user":"Miller","action":"enter","attempts":3,"name":{"first name":"Peter","middle name":null,"last name":"Miller"}} |
| JSON2: 206 | {"user":"Miller","action":"enter","attempts":3,"name":{"first name":"Peter","middle name":null,"last name":"Miller"}} |
| Delta: 208 | {} |
| \multicolumn{2}{c}{Example 2 – Irrelevant Differences 210} | |
| JSON1: 212 | {"user":"Miller","action":"enter","attempts":3,"name":{"first name":"Peter","middle name":null,"last name":"Miller"}} |
| JSON2: 214 | {"user":"Miller","attempts":3,"name":{"first name":"Peter","last name":"Miller","middle name":null},"action":"enter"} |
| Delta: 216 | {} |
| \multicolumn{2}{c}{Example 3 – Deletions on top level 218} | |
| JSON1: 220 | {"user":"Miller","action":"enter","attempts":3,"name":{"first name":"Peter","middle name":null,"last name":"Miller"}} |
| JSON2: 222 | {"user":"Miller","action":"enter"} |
| Delta: 224 | {"X":{"-attempts":3,"-name":{...}}} |
| \multicolumn{2}{c}{Example 4 – Deletions on lower level 226} | |
| JSON1: 228 | {"user":"Miller","action":"enter","attempts":3,"name":{"first name":"Peter","middle name":null,"last name":"Miller"}} |
| JSON2: 230 | {"user":"Miller","action":"enter","attempts":3,"name":{"first name":"Peter","last name":"Miller"}} |
| Delta: 232 | {"X":{"X:name":{"-middle name":null}}} |
| \multicolumn{2}{c}{Example 5 – Additions 234} | |
| JSON1: 236 | {"user":"Miller","action":"enter"} |
| JSON2: 238 | {"user":"Miller","action":"enter","attempts":3,"name":{"first name":"Peter","middle name":null,"last name":"Miller"}} |
| Delta: 240 | {"X":{"+attempts":3,"+name":{"first name":"Peter","middle name":null,"last name":"Miller"}}} |
| \multicolumn{2}{c}{Example 6 – Additions on lower level 242} | |
| JSON1: 244 | {"user":"Miller","action":"enter","attempts":3,"name":{"first name":"Peter","middle name":null,"last name":"Miller"}} |
| JSON2: 246 | {"user":"Miller","action":"enter","attempts":3,"name":{"title":"Dr.","first name":"Peter","middle name":null,"last name":"Miller"}} |
| Delta: 248 | {"X":{"X:name":{"+title":"Dr."}}} |
| \multicolumn{2}{c}{Example 7 – Recreations 250} | |
| JSON1: 252 | {"user":"Miller","action":"enter","attempts":3,"name":{"first name":"Peter","middle name":null,"last name":"Miller"}} |
| JSON2: 254 | {"user":"Miller","action":"enter","attempts":3,"name":"Dr. Peter Miller"} |
| Delta: 256 | {"X":{"X:name":"Dr. Peter Miller"}} |
| \multicolumn{2}{c}{Example 8 – Top level is not an object 258} | |
| JSON1: 260 | {"user":"Miller","action":"enter"} |
| JSON2: 262 | null 264 |
| Delta: 266 | {"X":null} |

FIG. 2A 200

| | Example 8 -- Simple Change with complete hash verification information |
|---|---|
| JSON1: 282 | {"user":"Miller","action":"entering"} |
| JSON2: 284 | {"user":"Miller","action":"enter"} |
| Delta: 286 | {"X":{"X":{"action":"enter"},"#:hash":{<br>"in":"r60vEBhH3R/u/NClrMcCYGtVnI8=", —288<br>"delta":"C3vx7JR0wY0v33mOofs/eAEE8aA=", —292<br>"out":"DZJXMFr54/yqIQQPnQR6ccEcNBY="}} —290 |

FIG. 2B  280

| | | |
|---|---|---|
| deltaJSON 302 | → | {} \| {"X":{ deltaJsonProps }} \| {"X": <simple JSON> } \| {"%":<JSON>} 304 |
| deltaJsonProps 306 | → | deltaJsonProp \| deltaJsonProps , deltaJsonProp 308 |
| deltaJsonProp 310 | → | opAddition \| opChange \| opRecreate \| opDeletion 312 |
| opAddition 314 | → | "+:<JsonPropertyName>":<JSON> 322 |
| opRecreate 316 | → | "%:<JsonPropertyName>":<JSON> 324 |
| opChange 318 | → | "X:<JsonPropertyName>": ({ deltaJsonProps } \| <simple JSON> ) 326 |
| opDeletion 320 | → | "-:<JsonPropertyName>": typeIdent 328 |
| typeIdent 330 | → | 0 \| "" \| {} \| [] \| false \| null 332 |

FIG. 3A

| 340 | |
|---|---|
| opAddition 342 | → ( "+:<JsonPropertyName>" \| "+#<Number>)" ) :<JSON> 350 |
| opRecreate 344 | → ( "%:<JsonPropertyName>" \| "%#<Number>)" ) :<JSON> 352 |
| opChange 346 | → ( "X:<JsonPropertyName>" \| "X#<Number>)" ) : ( { deltaJsonProps } \| <simple JSON> ) 354 |
| opDeletion 348 | → ( "-:<JsonPropertyName>" \| "-#<Number>)" ) : typeIdent 356 |

| 380 | |
|---|---|
| opRecreate 382 | → ( "%:<JsonPropertyName>" \| "%#<Number>)" ) : <JSON> \| ( "*:<JsonPropertyName>" \| "*#<Number>)" ) : [ <JSON>, <JSON> ] 388 |
| opChange 384 | → ( "X:<JsonPropertyName>" \| "X#<Number>)" ) : ( { deltaJsonProps } \| <simple JSON> ) \| ( "x:<JsonPropertyName>" \| "x#<Number>)" ) : [ <simple JSON>, <simple JSON of same type> ] 390 |
| opDeletion 386 | → ( "-:<JsonPropertyName>" \| "-#<Number>)" ) : typeIdent \| [ <JSON> ] 392 |

```
1: For all children nc1 of node1 with name "<t1>:<n1>"
2:     If <n1> is equal to any <n2> of a child nc2 of node 2 with name "<t2>:<n2>"
3:         Perform mergeDelta( nc1, nc2 )
4:         If mergeDelta result is a directive
5:             Add the directive to the result Delta JSON
6:         Else
7:             Don't add nc1 to the result Delta JSON
8:     Else
9:         Add nc1 to result Delta JSON under current node
10: For all children nc2 of node2 which were not covered in the preceding step
11:     Add nc2 to result Delta JSON under current node
```

FIG. 6 *600*

| mergeDelta 702 704 | {"+:<n>":<j2>} addition 716 | {"-:<n>":<v2>} deletion 718 | {"X:<n>":<ad2>} atomic change * 720 | {"X:<n>":{<d2>}} structural change 722 | {"%:<n>":<j2>} recreation 724 |
|---|---|---|---|---|---|
|  | 0 | 1 | 2 | 3 | 4 | 5 |
| 0  No directive 726 | No directive | {+:<n>:<j2>} | {"-:<n>":<v2>} | {"X:<n>":<ad2>} | {"X:<n>":{<d2>}} | {"%:<n>":<j2>} |
| 1  {"+:<n>":{<j1>}} addition 706 | {"+:<n>":{<j1>}} | N/A 734 | No directive 736 | {+:<n>:<ad2>} | {"+:<n>": applyDelta(<j1>,<d2>)} 743 | {"+:<n>":<j2>} 738 |
| 2  {"-:<n>":<v1>} deletion 708 710 | {"-:<n>":<v1>} | {"%:<n>":<j2>} 740 | N/A | N/A | N/A | N/A 745 |
| 3  {"X:<n>":<ad1>} atomic change | {"X:<n>":<ad1>} | N/A 748 | {"-:<n>":<v2>} 746 | {"X:<n>":<ad2>} 742 | N/A | {"%:<n>":<j2>} |
| 4  {"X:<n>":{<d1>}} structural change 712 | {"X:<n>":{<d1>}} | N/A 750 | {"-:<n>":<v2>} 747 | N/A | If mergeDeltas(<d1>,<d2>) returns a directive, then {"X:<n>":{mergeDeltas(<d1>,<d2>)}}, otherwise No directive 744 | {"%:<n>":<j2>} |
| 5  {"%:<n>":<j1>} recreation 714 | {"%:<n>":<j1>} | N/A 752 | {"-:<n>":<v2>} | {"%:<n>":<ad2>} | {"%:<n>": applyDelta(<j1>,<d2>)} | {"%:<n>":<j2>} 748 |

FIG. 7  700

Descr. Case

| Delta1 | 1 | {"+:a":{"name":"value"}} _804_ |
|---|---|---|
| Delta2 | 1 | {"+:a":{"name":"value2"}} _806_ |
| Merged result | 1/1 | N/A - Error _808_ |

⎬ _802_

| Delta1 | 1 | {"+:a":{"name":"value"}} _812_ |
|---|---|---|
| Delta2 | 2 | {"-:a":"{...}"} _814_ |
| Merged result | 1/2 | _816_ |

⎬ _810_

| Delta1 | 1 | {"+:a":{"name":"value"}} _820_ |
|---|---|---|
| Delta2 | 0 | No relevant delta for attribute „a" _822_ |
| Merged result | 1/0 | {"+:a":{"name":"value"}} _824_ |

⎬ _818_

| Delta1 | 1 | {"+:a":{"name":"value"}} _828_ |
|---|---|---|
| Delta2 | 5 | {"%:a":14} _830_ |
| Merged result | 1/5 | {"+:a":14} _832_ |

⎬ _826_

| Delta1 | 2 | {"-:a":"{...}"} _XXX_ |
|---|---|---|
| Delta2 | 1 | {"+:a":{"name":"value"}} _XXX_ |
| Merged Result | 2/1 | {"%:a":{"name":"value"}} _XXX_ |

| Delta1 | 3 | {"X:a":14} | *852* |
|---|---|---|---|
| Delta2 | 3 | {"X:a":15} | *854* |
| Merged Result | 3/3 | {"X:a":15} | *856* |

850

| Delta1 | 1 | {"+:a":{"name":"value"}} *862* |
|---|---|---|
| Delta2 | 4 | {"X:a":{"X:name":"value2","+:childs":3}} *864* |
| Merged Result | 1/4 xxx | {"+:a":{"name":"value2","childs":3}} *866* |

860

| Delta1 | 4 | {"X:a":{"+:childs":3}} | *872* |
|---|---|---|---|
| Delta2 | 4 | {"X:a":{"-:childs":3}} | *874* |
| Merged Result | 4/4 false | {} | *876* |

870

| Delta1 | 4 | {"X:a":{"X:name":"value","-:children":2,"+:hometown":"Munich"}} *882* *884* |
|---|---|---|
| Delta2 | 4 | {"X:a":{"X:name":"value2","+:children":3,"X:kids":{"X:2":"Marie, "+:3":"Sophie"}}} |
| Merged Result | 4/4 true | {"X:a":{"X:name":"value2","%:children":3,"+:hometown":"Munich"," X:kids":{"X:2":"Marie, "+:3":"Sophie"}}} *886* |

```
1: For all Childs nc1 of node 1 with name "<t1>:<n1>"
2:   Add ( "<n1>", nc1, null ) to table
3: For all Childs nc2 of node 2 with name "<t2>:<n2>"
4:   If search ( column1 = "<n2>" ) finds entry
5:     Update this entry to ( "<n1>", nc1, nc2 )
6:   Else
7:     Add ( "<n2>", null, nc2 ) to table
8: Perform MergeDelta ( column2, column3 ) for all entries of table
```

FIG. 9 *900*

GENERATION AND APPLICATION OF OBJECT NOTATION DELTAS

TECHNICAL FIELD

The present disclosure relates to computer-implemented methods, software, and systems for creating and merging delta object notation documents.

BACKGROUND

An object notation format, such as JSON (JavaScript Object Notation), can be a language-independent text format that can be human readable. Object notation content can include a collection of name/value pairs, which can describe objects, records, dictionaries or other types of data. Name/value pairs can be referred to as properties (or in some cases, attributes), with a property name and property value included in the name/value pair. Object notation can be parsed and consumed in multiple computing environments, as well as by human readers. Data in an object notation format can be streamed and sent between computing devices, as one example.

SUMMARY

The present disclosure involves systems, software, and computer implemented methods for creating and merging delta object notation documents. One example method includes: receiving a request to create a delta object notation document based on a first object notation document and a second object notation document, wherein each object notation document has a root property and a set of zero or more non-root properties, wherein each non-root property has a property name and a property value; comparing the first object notation document to the second object notation document to generate the delta object notation document in an object notation format, including: navigating properties in the first object notation document and the second object notation document to identify properties in the first object notation document and the second object notation document; determining, for each property identified in the first object notation document or the second object notation document, whether a property with a same name and parent exists in a corresponding first object notation document or a corresponding second object notation document; in response to determining, for an identified property, that a property with a same name and parent does not exist in the corresponding first object notation document or the corresponding second object notation document: generating a property-change-operation property, in the object notation format, that indicates a difference between the first object notation document and the second object notation document with respect to the identified property; and including the property-change operation property in the delta object notation document; and providing the delta object notation document in response to the request.

Implementations may include one or more of the following features. The object notation format can be JSON (JavaScript Object Notation). The first object notation document and the second object notation document can be parsed into respective internal representations. Parsing can include removing white space. Parsing can include sorting properties alphabetically. The property-change-operation property can indicate a change to an array included in the first object notation document. Navigating can include recursive navigating of nested properties. Version information can be in the delta object notation document. The delta object notation document can be applied to the first object notation document to produce the second object notation document. Applying the delta object notation document can include performing an operation for each property-change-operation property in the delta object notation document. A hash value generated based on the first object notation document can be included in the delta object notation document. The hash value can be used to verify that the delta object notation document was generated based on the first object notation document, before applying the delta object notation document to the first object notation document. In response to determining that a first property is in the second object notation document and not in the first object notation document, an added-property-operation property that indicates an addition of the first property to the second object notation document can be included, as the property-change-operation property, in the delta object notation document. In response to determining that a second property is in the first object notation document and is not in the second object notation document, a deleted-property-operation property that indicates a deletion of the second property from the first object notation document can be included, as the property-change-operation property, in the delta object notation document. The deleted-property-operation property might, or might not, indicate a value of the second property. In response to determining that a third property is present in both the first object notation document and the second object notation document with a same type and different values, a changed-property-operation property that indicates a change in value for the third property between the first object notation document and the second object notation document can be included, as the property-change-operation property, in the delta object notation document. In response to determining that a fourth property is present in both the first object notation document and the second object notation document with a different type, a recreated-property-operation property that indicates a change in type for the fourth property between the first object notation document and the second object notation document can be included, as the property-change operation property, in the delta object notation document.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 2A is a table that illustrates generation of delta JSON documents from first and second JSON documents.

FIG. 2B is a table that illustrates use of hash values in a delta JSON document

FIG. 3A is a table that illustrates a syntax for a delta JSON document.

FIG. 3B is a table that illustrates optional syntax for describing object notation changes related to arrays.

FIG. 3C is a table that illustrates optional syntax for enabling backward updates.

FIG. 6 illustrates example code for merging two delta JSON documents.

FIG. 7 is a table that describes processing for different delta JSON document merge scenarios.

FIGS. 8A and 8B illustrate examples of merging different combinations of directives included in two delta JSON documents that are being merged.

FIG. 9 illustrates example code for merging two delta JSON documents using a table for performance improvement.

DETAILED DESCRIPTION

Figure 1:
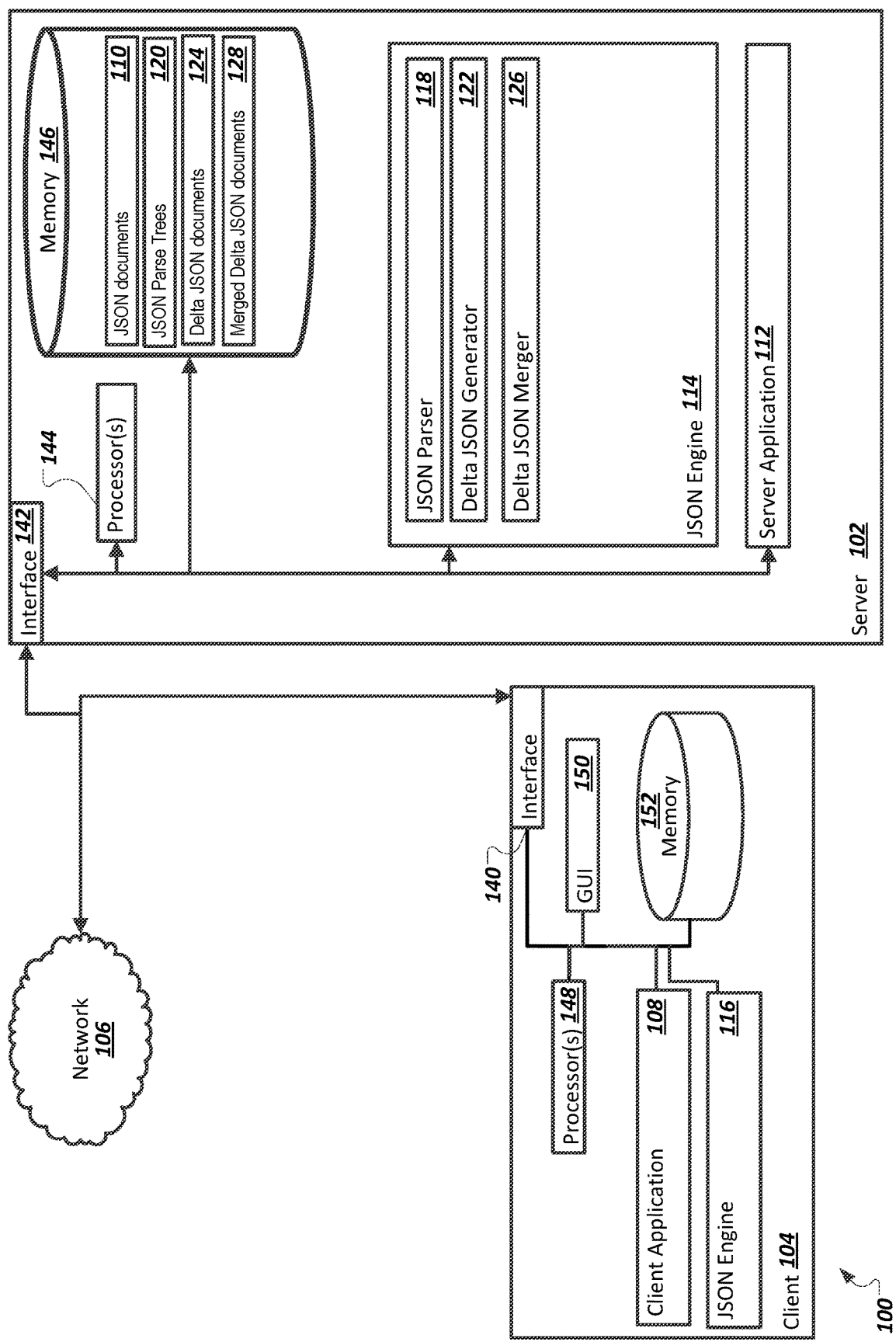
FIG. 1 is a block diagram illustrating an example system for creating and merging delta object notation documents.

Objection notation content, such as JSON documents, can be lightweight, platform and language-independent transport options. In some systems, different versions of a same JSON document may be generated over time. A user or system may wish to know differences between two versions of a JSON document. A delta that describes differences between two JSON documents can be generated and can also be represented as a JSON document. A delta JSON document can adhere to a standard format and can represent differences between two JSON documents, such as an older reference document and a newer changed document. When creating the delta JSON document, two parsing trees of respective JSON documents can be compared, and changes such as additions, deletions, value changes, and data type changes can be automatically detected, with a result returned in a JSON format.

The delta JSON document described herein can result in several advantages over other approaches for object notation comparison. The delta JSON document described herein can be smaller than deltas stored in other formats, such as arrays. Array formats can repeat information for a changed entity, for example. Generating tree-like JSON content that is similar in format to source JSON documents to describe differences in JSON documents can result in a format that more closely aligns with and is more familiar to the compared JSON documents, than alternative formats, such as arrays or other data structures. Accordingly, the delta JSON document described herein can be more human readable than other formats, such as arrays. Operations represented in a JSON delta can be independent, which can make applying a JSON delta more efficient and less error prone than other approaches in which listed operations are dependent.

Once multiple delta JSON documents exist, users or applications may desire to merge consecutive delta JSON documents into a single delta JSON document, to save space and to only have to deal with one rather than multiple documents. More than two delta JSONs can be combined eventually into a single, merged delta JSON, by performing multiple merge processes.

Merging can be an efficient way to combine delta files into a combined delta file. A combined delta file can be smaller than a sum of the delta files that are combined, due to optimizations. Merging can include removal of inefficient or irrelevant content, for example.

For example, a merge process can automatically optimize a resulting merged delta JSON in a way that unnecessary steps are removed. For instance, a first delta that describes changes between first and second versions of a document can describe a change to an element and a second delta that describes changes between versions two and three of a document can describe a deletion of the element. The merge process can detect this combination and perform the merge in such a way that the now irrelevant change is not recorded in the merged delta document (e.g., a change to a property that is deleted in a next version may not be meaningful to users or applications).

FIG. 1 is a block diagram illustrating an example system 100 for creating and merging delta object notation documents. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system or server may be provided by multiple systems or servers.

A user or an application may want to use JSON (or other object notation) documents. For example, a user may use a client application 108, such as a browser or editor, to view JSON documents. The client application 108 may display JSON documents that are copies of JSON documents 110 received from the server 102, for example. As another example, the client application 108 and/or a server application 112, or another application or system may access, read, and process the JSON documents 110 (or copies of the JSON documents 110).

The JSON documents 110 can include, for a given JSON document, multiple versions of the JSON document. For instance, newer version(s) of a document may be generated and may reflect change(s) from older version(s) of a document. A user, or an application, may desire to view differences between two JSON documents. The client application 108 may request a delta generation from a JSON engine, for example. The client application 108 can send a delta generation request to a JSON engine 114 running on the server 102 (or another server) or to a local JSON engine 116 running on the client device 104.

The JSON engine 114 (and/or the JSON engine 116) can include a JSON parser 118. The JSON parser 118 can generate JSON parse trees 120 from JSON documents 110. The JSON parser 118 can read a JSON document 110 and convert the JSON document 110 into a JSON parse tree 120. JSON parse trees 120 can be internal representations used by consumers of the JSON documents 110. An internal representation can be optimized for efficient navigation and manipulation. Data can be stripped of white space, properties can be sorted, etc. Navigation supported by a JSON parse tree 120 can include querying for particular properties, retrieving elements at particular levels (e.g., top level, nested levels), etc.

The JSON engine 114 (and/or the JSON engine 116) can include a delta JSON generator 122 that can generate delta JSON documents 124 (e.g., from the JSON parse trees 120). Delta JSON documents 124 can describe the following types of changes between compared JSON documents: a property was added, a property was deleted, a property value was changed, or a property value has changed its type. Delta JSON documents 124 can be also in a JSON format, which can aid human readers and automated processes. Since delta JSON documents are JSON documents themselves, the delta JSON generator 122 can create a delta JSON document 124 that describes differences between two delta JSON documents.

As another example, a delta JSON merger 126 can merge changes reflected in consecutive delta JSON documents into a merged delta JSON document 128. The delta JSON merger 126 can process two consecutive delta JSON documents, e.g., a first delta $JSON_{n,\ n+1}$ that describes differences between a JSON version n and a JSON version n+1, and a second delta $JSON_{n+1,\ n+2}$ that describes differences between the JSON version n+1 and a JSON version n+2. The delta JSON merger 126 can generate a merged delta JSON document 128 that combines the differences in the two delta JSONs. The delta JSON merger 126 can perform a merge by processing just the two delta JSON documents (e.g., without needing to process the original JSON documents 110). As mentioned above (and in more detail below), optimizations can be performed so that the merged delta JSON document 128 is smaller than a simple concatenation of the two delta JSON documents 124 that are merged.

The delta JSON merger 126 and the delta JSON generator 122 can be useful, for example, in software development workbench scenarios, where a user manipulates and stores artifacts in a JSON format, and may often save multiple versions of such documents.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 140 and 142 are used by the client device 104 and the server 102, respectively, for communicating with other systems in a distributed environment—including within the system 100—connected to the network 106. Generally, the interfaces 140 and 142 each comprise logic encoded in software and/or hardware in a suitable combination and operable to communicate with the network 106. More specifically, the interfaces 140 and 142 may each comprise software supporting one or more communication protocols associated with communications such that the network 106 or interface's hardware is operable to communicate physical signals within and outside of the illustrated system 100.

The server 102 includes one or more processors 144. Each processor 144 may be a central processing unit (CPU), a blade, an application specific integrated circuit (ASIC), a field-programmable gate array (FPGA), or another suitable component. Generally, each processor 144 executes instructions and manipulates data to perform the operations of the server 102. Specifically, each processor 144 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 146. In some implementations, the server 102 includes multiple memories. The memory 146 may include any type of memory or database module and may take the form of volatile and/or non-volatile memory including, without limitation, magnetic media, optical media, random access memory (RAM), read-only memory (ROM), removable media, or any other suitable local or remote memory component. The memory 146 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application 108. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 148. Each processor 148 included in the client device 104 may be a central processing unit (CPU), an application specific integrated circuit (ASIC), a field-programmable gate array (FPGA), or another suitable component. Generally, each processor 148 included in the client device 104 executes instructions and manipulates data to perform the operations of the client device 104. Specifically, each processor 148 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 150.

The GUI 150 of the client device 104 interfaces with at least a portion of the system 100 for any suitable purpose, including generating a visual representation of the modeling application 108. In particular, the GUI 150 may be used to view and navigate the model 110, various Web pages, or other user interfaces. Generally, the GUI 150 provides the user with an efficient and user-friendly presentation of business data provided by or communicated within the system. The GUI 150 may comprise a plurality of customizable frames or views having interactive fields, pull-down lists, and buttons operated by the user. The GUI 150 contemplates any suitable graphical user interface, such as a combination of a generic web browser, intelligent engine, and command line interface (CLI) that processes information and efficiently presents the results to the user visually.

Memory 152 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 152 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

FIG. 2A is a table 200 that illustrates generation of delta JSON documents from first and second JSON documents. A JSON document is an example of an object notation document. Two JSON documents can be compared, to create a delta JSON document. Comparing can include navigating property/attribute trees of both JSON documents, recursively, if nested objects exist, comparing properties that have a same parent object.

In a first example 202, a first JSON document 204 is compared to a second JSON document 206. JSON documents can include property name/value pairs. For example, the first JSON document 204 includes multiple property name/value pairs. For instance, a "user" property has a value of "Miller," an "action" property has a value of "enter," and an "attempts" property has a value of 3. The first JSON document 204 includes a property with a name of "name" that has a nested object as its value. The nested object has a "first name" property with a value of "Peter," a "middle name" property with a null value, and a "last name" property with a value of "Miller."

The second JSON document 206 is identical to the first JSON document 204, so a result of a delta JSON comparison for this example is an delta JSON document 208 that includes an empty object. A delta JSON document that includes an empty object (e.g., represented as empty brackets "{ }") can be used to indicate that no differences exist between compared JSON documents. Another type of result, such as an empty string " " or another kind of indicator (e.g., an error indicator) can be generated as a comparison result if one or both of the compared JSON documents are not valid. JSON documents can be parsed and validated before comparison, for example, to determine whether the compared documents include valid JSON syntax.

In a second example 210, a first JSON document 212 is compared to a second JSON document 214, and even though the second JSON document 214 includes a different ordering of some properties (e.g., an "action" property appears before the "name" property in the first JSON document 212 but appears after the "name" property in the second JSON document 214), the two JSON documents are treated as equal (as indicated by an empty delta JSON document 216). A JSON parser can sort properties before comparison (and perform other processing, such as removal of white space), so that irrelevant differences are not treated as differences for purposes of generating a delta JSON output, when source documents are compared.

In a third example 218, a first JSON document 220 is compared to a second JSON document 222. The second JSON document 222 does not include an "attempts" property or a "name" object that are included in the first JSON document 220. Accordingly, a delta JSON document 224 can include operation properties that describe the differences between the first JSON document 220 and the second JSON document 222. The delta JSON document 224 includes a "X" property, which is a placeholder that indicates that change(s) have occurred to the first JSON document 220.

The value of the "X" property in the delta JSON document 224 is a nested object that has two properties. The first property/value pair in the nested object is "–:attempts":3 e.g., with a property name of "–:attempts" and a property value of 3. The dash character "–" indicates deletion. A property name after the dash (e.g., "attempts") indicates which property in the first JSON document 220 was deleted. The value of 3 indicates a value that was deleted. Similarly, the second property/value pair in the nested object within the delta JSON document 224 is "–:name":"{ . . . }"

e.g., with a property name of "–:name" and a property value of "{ . . . }". The "–:name" property name indicates deletion of the "name" property from the first JSON document 220. Since "name" has an object as a value in the first JSON document 220, a placeholder value of "{ . . . }" is included in the delta JSON document 224 to indicate an object was deleted.

In general, for deletions, any property that has a name that is found in a first JSON document JSON1, but not in a second JSON document JSON2 can be treated as a deleted property and can be included in a delta JSON document using the following schema: "–:<name of deleted property>":<value of deleted property in JSON1>. In some implementations, for objects and arrays or for properties in general, the deleted property value is not specified fully, but can include a placeholder string, such as "{ . . . }" or "[ . . . ]". In some implementations, the value (or type) of the deleted property can be included for reference purposes, for example. In some implementations, only an indication of a type of deleted value is included (for reference).

In a fourth example 226, a first JSON document 228 is compared to a second JSON document 230. The second JSON document 230 does not include a "middle name" property within the "name" object as does the first JSON document 228. Accordingly, a delta JSON document 232 can include an operation property that describes the difference between the first JSON document 228 and the second JSON document 230. As described above, the delta JSON document 232 includes a "X" property, which is a placeholder that indicates that change(s) have occurred to the first JSON document 228.

The value of the "X" property in the delta JSON document 232 is a property/value pair, with the property name being "X:name" to indicate that a change has occurred to the "name" property within the first JSON document 228. The value of the "X:name" property is {"–:middle name":null} which indicates that a "middle name" property was deleted from the "name" property, and that the value of the "middle name" property was null.

In a fifth example 234, a first JSON document 236 is compared to a second JSON document 238. The second JSON document 238 includes an "attempts" property and a "name" object that are not included in the first JSON document 236. The "attempts" property and the "name" object have been added to the second JSON document 238, for example. Accordingly, a delta JSON document 240 can include an operation property that describes the differences between the first JSON document 236 and the second JSON document 238. As described above, the delta JSON document 240 includes a "X" property, which is a placeholder that indicates that change(s) have occurred to the first JSON document 236.

The value of the "X" property in the delta JSON document 240 is a nested object that has two properties. The first property/value pair in the nested object is "+:attempts":3 e.g., with a property name of "+:attempts" and a property value of 3. The plus character "+" indicates addition. A property name after the plus character (e.g., "attempts") indicates which property was added (e.g., in the second JSON document 238). The value of 3 after "+:attempts" indicates that a value of 3 was added as a property value for the "attempts" property. The second property/value pair in the nested object within the delta JSON document 240 is "+:name":{"first name":"Peter", "middle name":null, "last name":"Miller"} e.g., with a property name of "+name" and a property value of a nested object. The nested object includes three properties ("first name", "middle name", and "last name", with corresponding values. The "+name" property name indicates addition of the "name" property to the second JSON document 238.

In general, for additions, any property that has a name that is found in a second JSON document JSON2, but not in a first JSON document JSON1, can be treated as a new property and can be included in a delta JSON document using the following schema: "+:<name of added property>":<value of added property in JSON2>.

In a sixth example 242, a first JSON document 244 is compared to a second JSON document 246. The second JSON document 244 includes a "title" property within the "name" object that is not included in the first JSON document 244. Accordingly, a delta JSON document 248 can include an operation property that describes the differences between the first JSON document 244 and the second JSON document 246. As described above, the delta JSON document 248 includes a "X" property, which is a placeholder that indicates that change(s) have occurred to the first JSON document 244.

The value of the "X" property in the delta JSON document 248 is a property/value pair, with the property name being "X:name" to indicate that a change has occurred to the "name" property within the first JSON document 244. The value of the "X:name" property is {"+:title":"Dr."} which indicates that a "title" property was added to the "name" property, and that the value of the "title" property is "Dr.".

In a seventh example 250, a first JSON document 252 is compared to a second JSON document 254. In the first JSON document 252, the value of the "name" property is an object type whereas in the second JSON document 254 the value of the "name" property is a character string type. In other words, a type of the "name" property has changed between the first JSON document 252 and the second JSON document 254.

A delta JSON document 256 can indicate a type change using a re-creation indicator (e.g., indicating that a property has been re-created with a different type). For instance, the delta JSON document 256 includes a "% name" property, with the "%" character indicating a re-creation (of the "name" property). A value of the "% name" property is "Dr. Peter Miller", which is the value of the "name" property within the second delta JSON document 254. The "Dr. Peter Miller" value indicates the new type (character string) as well as the new value. In general, for re-creations, any attribute that has a name that is found in both a first JSON document JSON1 and a second JSON document JSON2 but with different types can be treated as a recreated attribute and can be represented in a delta document using a schema of "%:<name>":<value of recreated property in JSON2>. For merging operations, a recreation operation can apply, even if a type hasn't changed between delta JSONs that are being merged (as described in more detail below).

A re-creation can be considered as a different type of change than a simple change to a property. Any property that has a name that is found in both a first JSON document JSON1 and a second JSON document JSON2 with an identical type but with different values can be treated as a changed property. If the property is of type array or object, a changed property can be included in a delta document according to the following schema: "X:<name of changed property>":<deltaJSON describing the changes of the property value from JSON1 to JSON2>. For example, the process may be continued recursively on the value of the property. If the property is of type Boolean, string, number or null, the value from JSON2 can be used directly. For example, the changed property can be included in a delta document according to the following schema: "X:<name of changed property>":<value of changed property in JSON2>.

In an eighth example 258, a first JSON document 260 is compared to a second JSON document 262. The second JSON document 262 includes a null value 264. A delta JSON document 266 includes a "%" property which indicates that the overall type of the top level of the first JSON document 260 has changed. The value of the "%" property is "null", indicating that a new type of the top level of the second JSON document 262 is null.

FIG. 2B is a table 280 that illustrates use of hash values in a delta JSON document. In this example, a first JSON document 282 is compared to a second JSON document 284 to generate a delta JSON document 286. A difference between the first JSON document 282 and the second JSON document 284 is that a value of an "action" property is "entering" in the first JSON document 282 but "enter" in the second JSON document 284. Accordingly, the delta JSON document 286 includes a "X:action" property with a value of "enter", to indicate the changed value of the "action" property.

The delta JSON document 286 includes a first hash value 288 that is based on the first JSON document 282, a second hash value 290 that is based on the second JSON document 284, and a third hash value 292 that is based, for example, on the contents of the delta JSON document other than the included hash values. A hash value included in a delta JSON document can be used to verify the delta JSON document before using the delta JSON document.

For instance, at a time after the delta JSON document 286 is generated, a user (or an application) may have a copy of the first JSON document 282 and a copy of the delta JSON document 286 but may not be certain that the delta JSON document 286 was generated from the first JSON document 282. Before applying the delta JSON document 286 to the copy of the first JSON document 282, a hash value can be generated from the copy of the first JSON document 282 and compared to the first hash value 288 included in the copy of the delta JSON document 286. In general, a hash number can be used as a control mechanism to verify that a delta JSON document was actually generated using a particular source JSON document (and is therefore applicable to the source JSON document). Although hash values of JSON documents are described, in some implementations, hash values of internal canonical representations of JSON documents are generated and used for verification.

FIG. 3A is a table 300 that illustrates a syntax for a delta JSON document. The syntax for a delta JSON document can be defined by a deltaJSON pattern identifier 302 which is a placeholder for a delta JSON document pattern 304. The delta JSON document pattern 304 indicates that a delta JSON document can be either an empty object (e.g., indicated by { }) or an object that has one name/value pair. The one name/value pair in the delta JSON document can have a name of "X" indicating a top level change, or "%" indicating a recreation. When the name is "X", the corresponding value can be a an object with one or more JSON properties, indicated in the delta JSON document pattern 304 by a deltaJsonProps pattern identifier 306, or a simple JSON expression. When the name of the one name/value pair in the delta JSON object is "%" the corresponding value can be a JSON expression.

The deltaJsonProps pattern identifier 306 is a placeholder for a delta JSON properties pattern 308 which represents a list of one or more delta JSON properties. For instance, the delta JSON properties pattern 308 indicates that the list of one or more JSON properties can be either a single JSON property (indicated in the delta JSON properties pattern 308 by a deltaJsonProp pattern identifier 310) or a list of multiple JSON properties (indicated by a sequence of a deltaJsonProps pattern identifier and a deltaJsonProp identifier).

The deltaJsonProp pattern identifier 310 is a placeholder for a JSON property pattern 312. The JSON property pattern 312 indicates that a JSON property in the delta JSON object can be either an addition operator, a recreation operator, a change operator, or a deletion operator (represented in the JSON property pattern 312 by an opAddition pattern identifier 314, an opRecreate pattern identifier 316, an opChange pattern identifier 318, or an opDeletion pattern identifier 320, respectively).

The opAddition pattern identifier 314 is a placeholder for an addition operation pattern 322. The addition operation pattern 322 indicates that an addition operation is specified by a name value pair that has a name that begins with "+:" followed by a name of an added JSON property (with the added property indicated in the addition operation pattern 322 by a JsonPropertyName identifier). The corresponding value of the name/value pair in the addition operation is a JSON value to include as the value of the added JSON property.

The opRecreate pattern identifier 316 is a placeholder for a recreation operation pattern 324. The recreation operation pattern 324 indicates that a recreation operation is specified by a name value pair that has a name that begins with "%:" followed by a name of a JSON property that was recreated (e.g., with a new data type), with the property that was recreated indicated in the recreation operation pattern 324 by a JsonPropertyName identifier. The corresponding value of the name/value pair in the recreation operation is a JSON value to include as the value of the recreated JSON property.

The opChange pattern identifier 318 is a placeholder for a change operation pattern 326. The change operation pattern 326 indicates that a change operation is specified by a name value pair that has a name that begins with "X:" followed by a name of a JSON property that was changed, with the property that was changed indicated in the change operation pattern 326 by a JsonPropertyName identifier. The corresponding value of the name/value pair in the change operation indicates what value the changed property was changed to, and can be either a simple JSON expression, or an object with one or more JSON properties (e.g., as indicated by a deltaJsonProps identifier). A simple JSON expression is any JSON entity that is neither an object nor an array (e.g., a number, string, Boolean value, or null value).

The opDeletion pattern identifier 320 is a placeholder for a deletion operation pattern 328. The deletion operation pattern 328 indicates that a deletion operation is specified by a name value pair that has a name that begins with "–:" followed by a name of a JSON property that was deleted, with the property that was deleted indicated in the deletion operation pattern 328 by a JsonPropertyName identifier. The corresponding value of the name/value pair in the deletion operation is a type identifier that indicates a type of value that was deleted (e.g., indicated in the deletion operation pattern 328 by a typeIdent pattern identifier 330).

The typeIdent pattern identifier 330 is a placeholder for a type identifier pattern 330. The type identifier pattern 330 indicates that a type identifier can be either a value 0 indicating that a numeric value was deleted, an empty string " " indicating that a string value was deleted, an empty object indicating that an object was deleted, a pair of array brackets [ ] indicating that an array was deleted, a value false indicating that a Boolean value was deleted, or a null value.

In further detail, a delta JSON document is a document in a JSON format, which follows certain criteria. The top node of the delta JSON document is an object which can be implicitly treated as a structural change—e.g., its content describes the changes of the addressed subtree. For the top node, these are the changes on the complete JSON. Every structural change in the delta JSON document (except the top node) can have a name that follows a pattern of "X:<n>", where n is the original name of the property. For a root node of the original JSON document (which has no name) a colon and the name can be omitted, hence changes to the root node can be indicated by, for example, a placeholder indicator of "X". This entry is generally an attribute of the top node object of the delta JSON Structural changes can have a property of type object. The property can include child attributes which follow a naming convention of "<t>:<n>", where <t>∈{"+", "−", "X", "%"} and where <n> is the name of the original property that is unique within its parent. Properties themselves can represent structural changes again with a name having a pattern of "X:<nc>", where <nc> is the name of a child property of the original object property <n>, or the index of an entry of an original array attribute <n>.

FIG. 3B is a table 340 that illustrates optional syntax for describing object notation changes related to arrays. The optional syntax can be used, in some examples, to distinguish adaptation, where a documented change applies to an element of an array rather than an element of an object. The optional syntax can apply to an addition operator, a recreation operator, a change operator, or a deletion operator (represented in the optional syntax by an opAddition pattern identifier 342, an opRecreate pattern identifier 344, an opChange pattern identifier 346, or an opDeletion pattern identifier 348, respectively).

The opAddition pattern identifier 342, the opRecreate pattern identifier 344, the opChange pattern identifier 346, and the opDeletion pattern identifier 348 are placeholders for an addition operation pattern 350, a recreation operation pattern 352, a change operation pattern 354, or a deletion operation pattern 356, respectively. The addition operation pattern 350, the recreation operation pattern 352, the change operation pattern 354, and the deletion operation pattern 356 are similar to corresponding patterns in the syntax described above with respect to FIG. 3A. Each pattern in FIG. 3B includes an optional property value option, such as a property value option 358 of "+#<Number>", where "Number" is the index of an array entry which should be manipulated. In summary, a difference between the optional syntax in FIG. 3B from corresponding items in FIG. 3A is that for array item changes, a "#" rather than a ":", following an operation character indicator (e.g., "+", "%", "X", "−""), signifies a change to an array.

FIG. 3C is a table 380 that illustrates optional syntax for enabling backward updates. An opRecreate pattern identifier 382, an opChange pattern identifier 384, and an opDeletion pattern identifier 386 are placeholders for a recreation operation pattern 388, a change operation pattern 390, or a deletion operation pattern 392, respectively. The recreation operation pattern 388, the change operation pattern 390, and the deletion operation pattern 392 include the same items as the recreation operation pattern 352, the change operation pattern 354, and the deletion operation pattern 356 in FIG. 3B, respectively, but with an optional value pattern as a last portion of a respective pattern.

For instance, the recreation operation pattern 388 includes a last portion 394 of "[<JSON>,<JSON>]", which describes a value pattern for enabling a property value in a delta object notation document to indicate a previous value and a changed value (with the changed value having a different type than the previous value, due to the documented recreation). As another example, the change operation pattern 390 includes a last portion 396 of "[<simple JSON>,<simple JSON of same type>]", which describes a value pattern for enabling a property value in a delta object notation document to indicate a previous value and a changed value (with the changed value having the same type as the previous value). As yet another example, the deletion operation pattern 392 includes a last portion 398 of "[<JSON>]", which describes a value pattern whereby a property value in the delta object notation document includes the full JSON value of the property that was deleted.

Including the full JSON value of the property that was deleted can enable backward application of the delta JSON document. That is, in addition to being able to apply the delta JSON document to a first version of a JSON document, to generate a second, subsequent version of the JSON document, full deletion information can enable application of the delta JSON document to the second version of the JSON document, to generate the first version of the JSON document (e.g., with either scenario representing a situation where a user or application has one version of the JSON document and the delta JSON document, but not the other desired version of the JSON document).

Figure 4:
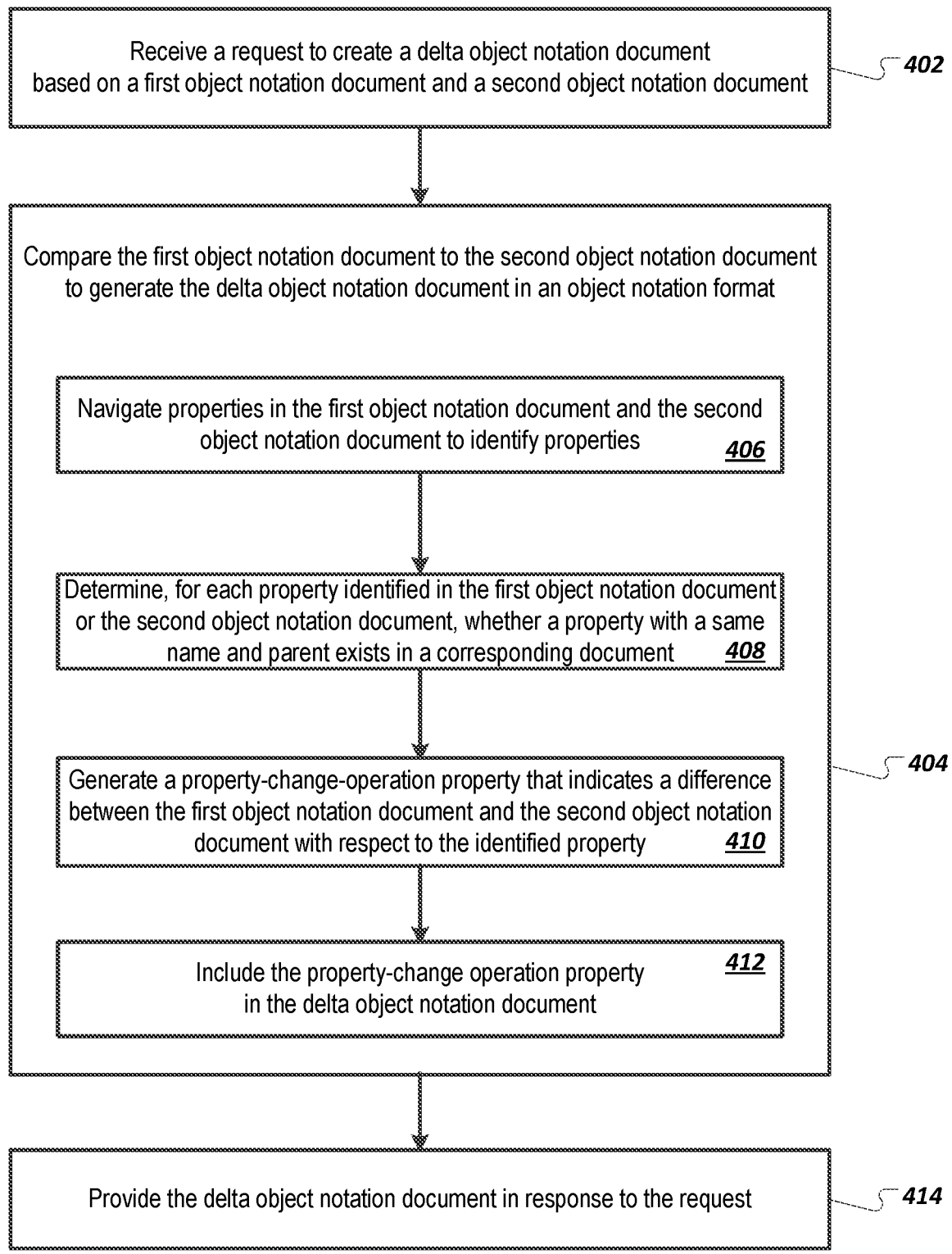
FIG. 4 is a flowchart of an example method for creating delta object notation documents.

FIG. 4 is a flowchart of an example method 400 for creating a delta object notation document. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the delta JSON generator 122 of FIG. 1.

At 402, a request is received to create a delta object notation document based on a first object notation document and a second object notation document. An object notation document can include a root property and can include other properties, with each non-root property having a property name and a property value. In some examples, a non-root property can have an index within an array which is treated as a name.

At 404, the first object notation document is compared to the second object notation document to generate the delta object notation document in an object notation format. The object notation format can be JSON. Before being compared, the first object notation document and the second object notation document can be parsed into respective internal representations. Parsing can include, for example, removing white space or sorting properties.

For example, at 406, properties in the first object notation document and the second object notation document are navigated to identify properties in the first object notation document and the second object notation document. Navigation can include recursive navigation of nested properties.

At 408, a determination is made, for each property identified in the first object notation document or the second object notation document, as to whether a property with a same name and parent exists in a corresponding first object notation document or a corresponding second object notation document. A corresponding object notation document of a given document is a document that is being compared to the given document.

At 410, in response to determining, for an identified property, that a property with a same name and parent does not exist in the corresponding first object notation document or the corresponding second object notation document, a property-change-operation property is generated, in the object notation format, that indicates a difference between the first object notation document and the second object notation document with respect to the identified property.

At 412, in response to determining, for the identified property, that an identical property does not exist in the corresponding first object notation document or the corresponding second object notation document, the property-change operation property is included in the delta object notation document.

For example, in response to determining that a first property is in the second object notation document and not in the first object notation document, an added-property-operation property that indicates an addition of the first property to the second object notation document can be included in the delta object notation document. As another example, in response to determining that a second property is in the first object notation document and is not in the second object notation document, a deleted-property-operation property that indicates a deletion of the second property from the first object notation document can be included, as the property-change-operation property in the delta object notation document. The deleted-property-operation may or may not include a value of the second property.

In response to determining that a third property is present in both the first object notation document and the second object notation document with a same type and different values, a changed-property-operation property that indicates a change in value for the third property between the first object notation document and the second object notation document can be included as the property-change-operation property in the delta object notation document. In response to determining that a fourth property is present in both the first object notation document and the second object notation document with a different type, a recreated-property-operation property that indicates a change in type for the fourth property between the first object notation document and the second object notation document can be included as the property-change operation property in the delta object notation document.

At 414, the delta object notation document is provided in response to the request. In some implementations, a version information is included in the delta object notation document.

After the delta object notation document is generated, the delta object notation document can be applied to the first object notation document to produce the second object notation document. For instance, a user may have the first object notation document and the delta object notation document but not the second object notation document. Applying the delta object notation document can include performing an operation for each property-change-operation property in the delta object notation document. In some implementations, a hash value generated based on the first object notation document is included in the delta object notation document and the hash value is used to verify that the delta object notation document was generated based on the first object notation document, before applying the delta object notation document to the first object notation document.

Figure 5:
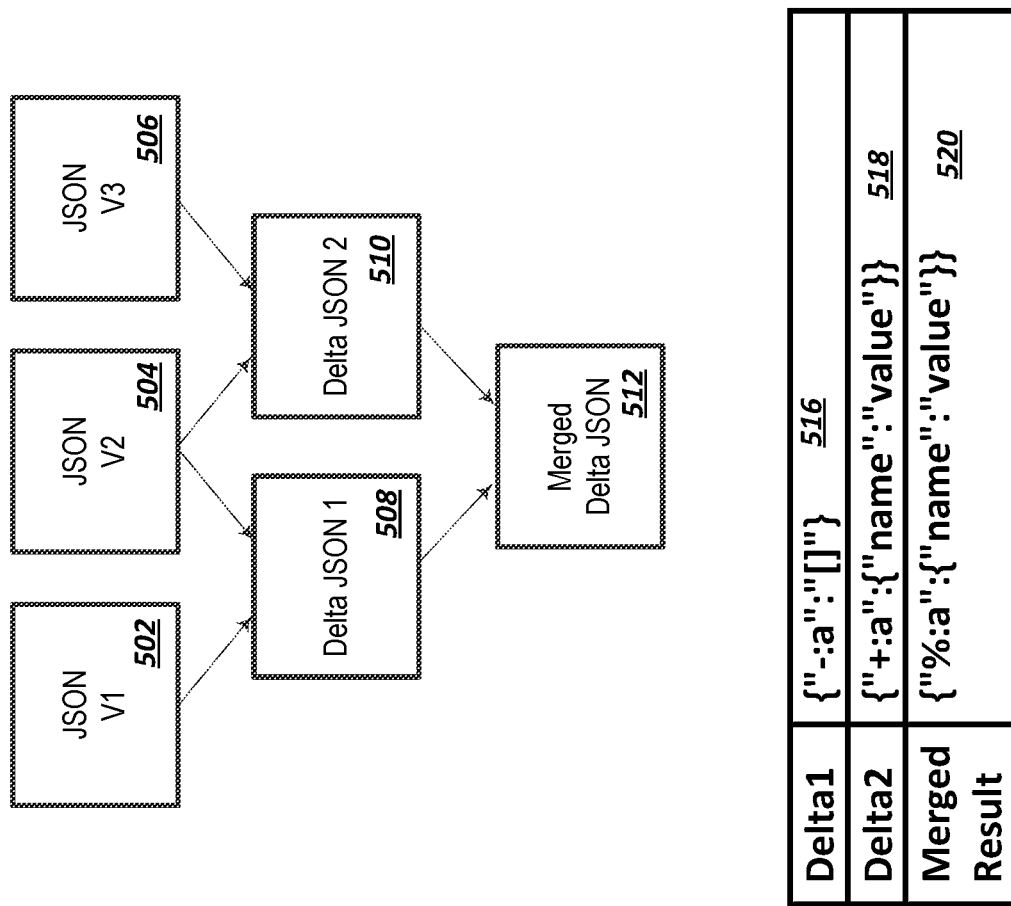
FIG. 5 illustrates creation of a merged delta JSON document.

FIG. 5 illustrates creation of a merged delta JSON document. A JSON document can have multiple versions, as described above. For instance, a particular JSON document may have first 502, second 504, and third 506 versions. As described above, delta JSON documents can be created from different versions of a JSON document. For instance a first delta JSON document 510 has been created from the first version 502 and the second version 504 of the JSON document. As another example, a second delta JSON document 510 has been created from the second version 504 and the third version 506 of the JSON document.

Given two delta JSON documents, a merge tool can merge the two delta JSON documents into a merged delta JSON document. For instance, a merged delta JSON document 512 has been created from the first delta JSON document 508 and the second delta JSON document 510. As described above, the merged delta JSON document 512 can be more convenient, being a single document vs. multiple delta documents, and the merged delta JSON document 512 can be smaller than the sum of merged documents, since optimizations can be performed to include only relevant/necessary delta operations (e.g., redundant or inverse operations can be merged or removed).

As an example, the first delta JSON document 508 can include a first delta JSON object 516 and the second delta JSON document 510 can include a second delta JSON object 518. The first delta JSON object 516 includes a property that indicates that a property named "a" was deleted from the first version 502 of the JSON document when the first version 502 was compared to the second version 504. The second delta JSON object 518 includes a property that indicates that the property named "a" has been added to the third version 506 of the JSON document. The merge tool can evaluate a deletion directive in the first delta JSON object 516 and an addition directive in the second delta JSON object 518 and determine to add a merged delta JSON object 520 to the merged delta JSON document 512. The merged delta JSON object 520 includes a recreation directive. A type of directive to include in the merged delta JSON document 512 can be determined, for example, based on predetermined rules that are based on types of directives included in the two delta JSON documents that are being merged.

FIG. 6 illustrates example code 600 for merging two delta JSON documents. The code 600 can be executed to iterate over all direct child properties of both nodes (e.g., a first node representing a first delta JSON document and a second node representing a second delta JSON document) and perform a mergeDelta process for respective combinations of properties. Recursive mergeDelta processing may be performed. In further detail, on line 1, a first iteration structure is executed to iterate over all child nodes (denoted as nc1) of the first node, with each child node nc1 having a name that matches a pattern of "<t1>:<n1>" (e.g., an operation ("+", "−", "%" or "X") represented by "t1" and an original property name represented by "n1".

At line 2, a first decision test is performed to determine whether the property name of the child node nc1 is equal to any property names n2 of a child node nc2 of the second node (e.g., where the child node nc2 of the second node has a name with a pattern of "<t2>:<n2>"). If the first decision test is true, a mergeDelta process is performed, at line 3, using the child node nc1 of the first node and the child node nc2 of the second node. The mergeDelta process can be performed according to a table 700 described below with respect to FIG. 7. At lines 4-5, if a result of the mergeDelta process is a directive, the directive is added to a result delta JSON document. At lines 6-7, if the result of the mergeDelta process is not a directive, the child node nc1 is not added to the result delta JSON. If the first decision test is not true, then at line 9, the child node nc1 is added to the result delta JSON document under the current node.

At line 10, a second iteration structure is executed to iterate over all child nodes nc2 of the second node that were not processed during execution of the first iteration structure. At line 11, a current child node nc2 being processed in the second iteration structure (e.g., a child node that was not processed in the first iteration structure) is added to the result delta JSON document under the current node.

FIG. 7 is a table 700 that describes processing for different delta JSON document merge scenarios. The table 700 includes information for how to merge a combination of two different types of delta JSON artifacts. A first column 702 and a first row 704 describe patterns of directives that may be included in a first delta JSON document or a second delta JSON document, respectively, when the first delta JSON document is being merged with the second delta JSON document. For instance, the first delta JSON document may include an addition directive 706, a deletion directive 708, an atomic change directive 710, a structural change directive 712, or a recreation directive 714, for a property generically named "n". Similarly, the second delta JSON document may include an addition directive 716, a deletion directive 718, an atomic change directive 720, a structural change directive 722, or a recreation directive 724, for the property named "n".

The table 700 (or equivalent logic) can be referenced when one but not both of the delta JSON documents include a directive for a property. A third row 726 and a third column 728 each include rules or patterns indicating how to handle a situation when either only the first delta JSON document or only the second delta JSON document include a directive for a certain property, respectively. The third row 726 and the third column includes patterns/rules that essentially indicate that if only one of the delta JSON documents being merged includes a directive for a given property, that the directive be included in the merged delta JSON document.

A delta JSON document not including a directive for a given property can be referred to as a directive type of zero for the given property, as indicated in a second row 730 and a second column 732, respectively. The second row 730 and the second column 732 also indicate that directive types for addition, deletion, atomic changes, structural changes, and recreations are one, two, three, four, and five, respectively. Directive types are used for discussing merge examples below.

For the remainder of the table 700 other than the first three rows and first three columns, the table 700 is structured so that a cell of the table 700 at an intersection of a row and column in the table 700 includes a predefined rule (or pattern) that indicates how to generate a merged delta JSON property from the two delta JSON properties related to the "n" property that are included in the first delta JSON document and the second delta JSON document. The table 700 can be referenced, for example, when both delta JSON documents include delta directives for a same property (e.g., a property named "n", or some other property name).

FIGS. 8A and 8B illustrate examples of merging different combinations of directives included in two delta JSON documents that are being merged. The examples can be discussed with reference to the table 700 of FIG. 7. In a first example 802, a first delta JSON document and a second delta JSON document each include a directive of type one (e.g., addition) for a property named "n", e.g., as shown by directives 804 and 806, respectively. A merging of two additions (e.g., a merge type of 1/1) can be considered as invalid, as indicated by a merge result error message 808. If the "n" property is already included in a JSON document (e.g., due to a first addition represented by the directive 804), then a second addition (e.g., corresponding to the directive 806), while the property is in the document, is not a valid operation. A cell 734 indicates that the combination of two additions for a same property is not applicable (e.g., not valid).

In this case, the second delta JSON document can be considered as not matching (e.g., not fitting, not corresponding to) the first delta JSON document. In some implementations, hash values can be verified before delta JSON documents are merged. For example, a merge tool can verify, before performing a merge, whether a target hash code of a delta JSON n, n+1 is equal to a source hash code of a delta JSON n+1, n+2.

In a second example 810 in FIG. 8A, a first directive 812 in the first delta JSON document is an addition directive. A second directive 814 in the second delta JSON document is a deletion directive, of the same property (e.g., a property named "a"). A merged result 816 and a cell 736 in the table 700 each indicate that no directive is to be included in the merged delta JSON document when a deletion directive follows an addition directive, for a same property.

A third example 818 illustrates a scenario discussed above, where the first delta JSON document includes a directive for a property (e.g., an addition directive 820), and the second delta JSON document does not include a directive relevant to the property, e.g., as indicated by a note 822. A merged result 824 is equivalent to the addition directive 820 (e.g., the directive included in just one of the delta JSON documents is essentially copied into the merged delta JSON document).

In a fourth example 826, a first directive 828 in the first delta JSON document is an addition directive. A second directive 830 in the second delta JSON document is a recreation directive, of the same property (e.g., a property named "a"). A merged result 832 and a cell 738 in the table 700 each indicate that a combination of an addition and a recreation is to be included, in the merged delta JSON document, as an addition directive.

In a fifth example 834, a first directive 836 in the first delta JSON document is a deletion directive. A second directive 838 in the second delta JSON document is an addition directive, of the same property (e.g., a property named "a"). A merged result 840 and a cell 740 in the table 700 each indicate that a combination of an addition and a recreation is to be included, in the merged delta JSON document, as a recreation directive.

In a sixth example, in FIG. 8B, a first directive 850 in the first delta JSON document and a second directive 852 in the second delta JSON document are each atomic change directives, of the same property. A merged result 854 and a cell 742 in the table 700 each indicate that a combination of two atomic change directives is to result in the second atomic change directive being included, in the merged delta JSON document.

In a seventh example 860, a first directive 862 in the first delta JSON document and a second directive 864 in the second delta JSON document each include a property "a". Accordingly, a merge process is performed. An operation in the first directive 862 is "+", and an operation in the second directive 864 is a "X" on an object (e.g., a structural change). Accordingly, cell 743 in the table 700 is applied, which results in the inclusion of an addition operation of the property "a" in a merged result 866. The value of the addition property is a value provided in the first directive 862 with a change from the second directive 864 applied. An inner delta JSON2 of {"X:name":"value2", "+:childs":3} includes two changes, which are applied on {"name": "value"}, which results in a resultant value of {"name": "value2", "childs":3}. The addition operation combined with the resultant value is {"+:a":{"name":"value2", "childs":3}} (e.g., as shown for the merged result 866).

In an eighth example 870, a first directive 872 in the first delta JSON document and a second directive 874 in the second delta JSON document each include a property "a".

Accordingly, a merge process is performed. An operation in the first directive 872 and an operation in the second directive 874 are each a "X" on an object (e.g., a structural change). Accordingly, cell 744 in the table 700 is applied, which results in recursive application on the corresponding values of {"+:childs":3} and {"−:childs":3}. (As mentioned above, for a deletion, rather than a deleted value of "3", a value of "0" indicating a type of deleted value can be included, in the second directive 874). The recursive merging of the values {"+:childs":3} and {"−:childs":3} results in identification of an addition operation and a deletion operation, which leads to cell 736, which indicates that no directive is to be returned. As discussed for FIG. 6, if no directive is returned, then an outer attribute (e.g., "a" in this example) is also not returned (discarded). Accordingly, a final merged result 876 can be an empty object. For example, the two changes are cancelling each other and the merged deltaJSON is no longer considered a change.

In a ninth example 880, a first directive 882 in the first delta JSON document includes directives for "name", "children", and "hometown" properties. A second directive 884 in the second delta JSON document includes directives for "name", "children", and "kids" properties. A merged result 886 shows a result of a merge process, with directives for "name" and directives for "children" being merged, and directives for "hometown" and "kids" being added to the merged result 886 (e.g., due to being in one but not the other delta JSON).

Referring again to FIG. 7, the table 700 includes other cells that indicate other patterns for other combinations of directives. For instance, cells 745, 746, and 747 indicate that atomic changes, structural changes, or recreations, followed by a deletion, should result in inclusion of the deletion directive (and not the other directive).

Some combinations are deemed to be invalid (e.g., as discussed above for the cell 734). For example, cells 748, 750, and 752 are similar to the cell 734, in that they indicate that an addition of a property is not considered a valid operation if it follows an atomic change, a structural change, or a recreation of the same property (e.g., with a same understanding that adding something that is already included in a document is not a valid operation.

As another example, cell 754 covers a case where a recreation is followed by a recreation. As indicated in the cell 754, such a combination can result in a recreation in the merged result. However, it may or may not be the case that a type of the property switches on a merging of recreations. For instance, if two delta JSONs are merged there may be a situation where a recreate operation results even if the type does actually not change. For example, a recreation from a number to a string may be included in a first delta JSON (e.g., version 1 to version 2 of a JSON) and a recreation from a string back to a number may be included in a second delta JSON (e.g., version 2 to version 3 of the JSON). The merge process may longer have information on the type of the property in the first version of the JSON, and accordingly, the merged recreation operations can be treated as a recreation. A similar outcome can occur as applied to the cell 740, when an addition in the second delta JSON follows a deletion in the first delta JSON (e.g., a recreation operation can be a merged result).

FIG. 9 illustrates example code 900 for merging two delta JSON documents using a table for performance improvement. The code 900 can be executed to improve performance using a local sorted table. In further detail, on line 1, a first iteration structure is executed to iterate over all child nodes (denoted as nc1) of the first node, with each child node nc1 having a name that matches a pattern of "<t1>:<n1>" (e.g., an attribute with a name "t1" and an attribute value of "n1". Within the first iteration structure, a tuple is added to the local sorted table, with the tuple having the values "<n1>", nc1, and null.

Line 3 begins a recursion structure that processes all child nodes nc2 of the second node, with each child node nc2 having a name that matches a pattern of "<t2>:<n2>". At line 4, a decision test is performed to determine whether an entry in the local search table that matches the n2 attribute value is found. If the entry is found, the entry is updated, at line 5, to tuple values of "<n1>", nc1, nc2. If the entry is not found, a tuple with values "<n2>", null, nc2 is added to the local sorted table. At line 8, the mergeDelta is performed using the second and third tuple values (e.g., second and third table columns, respectively), for all entries of the table.

Figure 10:
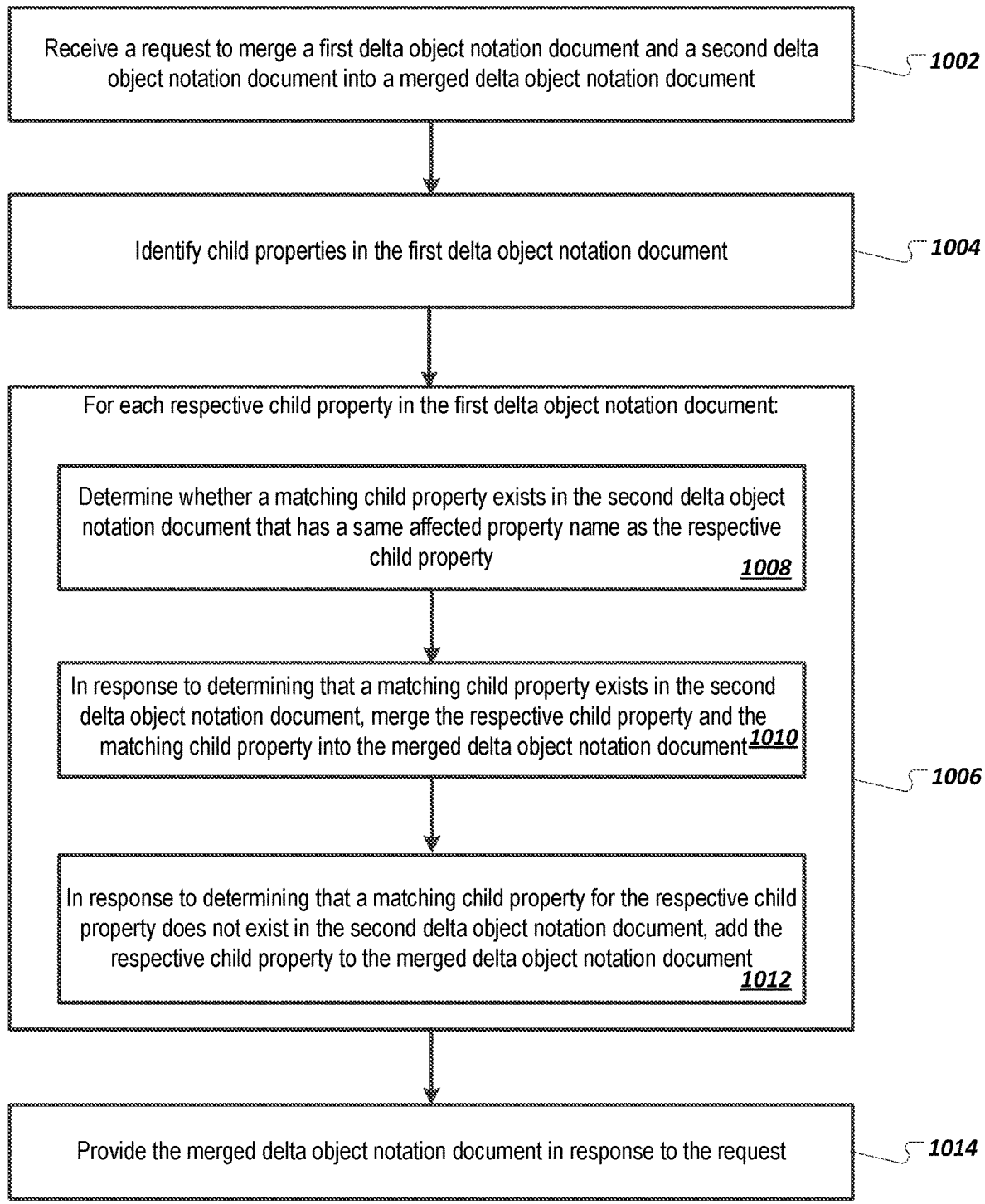
FIG. 10 is a flowchart of an example method for creating a merged delta object notation document.

FIG. 10 is a flowchart of an example method 1000 for creating a merged delta object notation document. It will be understood that method 1000 and related methods may be performed, for example, by any suitable system, environment, software, and hardware, or a combination of systems, environments, software, and hardware, as appropriate. For example, one or more of a client, a server, or other computing device can be used to execute method 1000 and related methods and obtain any data from the memory of a client, the server, or the other computing device. In some implementations, the method 1000 and related methods are executed by one or more components of the system 100 described above with respect to FIG. 1. For example, the method 1000 and related methods can be executed by the delta JSON merger 126 of FIG. 1.

At 1002, a request is received to merge a first delta object notation document and a second delta object notation document into a merged delta object notation document. The first delta object notation document describes differences between a first version of an object notation document and a second version of the object notation document. The second version can be a later version of the object notation document than the first version. The second delta object notation document describes differences between the second version of the object notation document and a third version of the object notation document. The third version can be a later version of the object notation document than the second version. The object notation document, the first delta object notation document, the second delta object notation document, and the merged delta object notation document can be in a JavaScript Object Notation (JSON) format.

At 1004, child properties are identified in the first delta object notation document. Each child property includes a delta directive and an affected property name that the delta directive is configured to affect.

At 1006, processing is performed for each respective child property in the first delta object notation document.

At 1008, a determination is made as to whether a matching child property exists in the second delta object notation document that has a same affected property name as the respective child property.

At 1010, in response to determining that a matching child property exists in the second delta object notation document, the respective child property and the matching child property are merged into the merged delta object notation document based on a first delta directive in the respective child property and a second delta directive in the corresponding matching child property. The first delta directive and the delta second directive can each be one of an addition directive, a deletion directive, an atomic change directive, a structural change directive, or a type-change directive. Step 106 can be recursively repeated, for nested child properties within the matching child property (with recursion possible to more than two levels).

Merging can include determining whether a combination of the first delta directive and the second delta directive is a valid combination. If the combination of the first delta directive and the second delta directive is a valid combination, a merged child property can be generated based on a predefined rule configured for the combination of the first delta directive and the second delta directive. The merged child property includes the affected property and a merged delta directive that is based on the first delta directive and the second delta directive. The merged child property can be included in the merged delta object notation document. Merging can include determining that a combination of the first delta directive and the second delta directive is not a valid combination, and accordingly, determining to not include the matched child property in the merged delta object notation document. Additionally, the merging process can be halted, and an error reported.

At 1012, in response to determining that a matching child property for the respective child property does not exist in the second delta object notation document, the respective child property is added to the merged delta object notation document. Additionally, child properties in the second delta object notation document that have not been matched to the first object notation document can be identified, and added to the merged delta object notation document.

At 1014, the merged delta object notation document is provided in response to the request.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving a request to create a delta object notation document based on a first object notation document and a second object notation document, wherein each object notation document has a root property and a set of zero or more non-root properties, wherein each non-root property has a property name and a property value;
parsing the first object notation document into a first internal representation and the second object notation document into a second internal representation, wherein parsing includes sorting properties alphabetically;
comparing the first internal representation of the first object notation document to the second internal representation of the second object notation document to generate the delta object notation document in an object notation format, including:
navigating properties in the first internal representation of the first object notation document and the second internal representation of the second object notation document to identify properties in the first object notation document and the second object notation document;
determining, for each property identified in the first object notation document or the second object notation document, whether a property with a same name and parent exists in a corresponding first object notation document or a corresponding second object notation document;
in response to determining, for an identified property, that a property with a same name and parent does not exist in the corresponding first object notation document or the corresponding second object notation document:
generating a property-change-operation property, in the object notation format, that indicates a difference between the first object notation document and the second object notation document with respect to the identified property; and
including the property-change-operation property in the delta object notation document; and
providing the delta object notation document in response to the request.

2. The method of claim 1, wherein the object notation format is JSON (JavaScript Object Notation).

3. The method of claim 1, wherein parsing includes removing white space.

4. The method of claim 1, wherein the property-change-operation property indicates a change to an array included in the first object notation document.

5. The method of claim 1, wherein navigating includes recursive navigating of nested properties.

6. The method of claim 1, further comprising including version information in the delta object notation document.

7. The method of claim 1, further comprising applying the delta object notation document to the first object notation document to produce the second object notation document.

8. The method of claim 7, wherein applying the delta object notation document comprises performing an operation for each property-change-operation property in the delta object notation document.

9. The method of claim 7, further comprising:
including, in the delta object notation document, a hash value generated based on the first object notation document; and
using the hash value to verify that the delta object notation document was generated based on the first object notation document, before applying the delta object notation document to the first object notation document.

10. The method of claim 1, further comprising: in response to determining that a first property is in the second object notation document and not in the first object notation document, including, as the property-change-operation property in the delta object notation document, an added-property-operation property that indicates an addition of the first property to the second object notation document.

11. The method of claim 1, further comprising: in response to determining that a second property is in the first object notation document and is not in the second object notation document, including, as the property-change-operation property in the delta object notation document, a deleted-property-operation property that indicates a deletion of the second property from the first object notation document.

12. The method of claim 11, wherein the deleted-property-operation property indicates a value of the second property.

13. The method of claim 12, wherein the deleted-property-operation property does not indicate the value of the second property.

14. The method of claim 1, further comprising: in response to determining that a third property is present in both the first object notation document and the second object notation document with a same type and different values, including as the property-change-operation property in the delta object notation document, a changed-property-operation property that indicates a change in value for the third property between the first object notation document and the second object notation document.

15. The method of claim 1, further comprising: in response to determining that a fourth property is present in both the first object notation document and the second object notation document with a different type, including as the property-change-operation property in the delta object notation document, a recreated-property-operation property that indicates a change in type for the fourth property between the first object notation document and the second object notation document.

16. A system comprising:
one or more computers; and
a computer-readable medium coupled to the one or more computers having instructions stored thereon which, when executed by the one or more computers, cause the one or more computers to perform operations comprising:
receiving a request to create a delta object notation document based on a first object notation document and a second object notation document, wherein each object notation document has a root property and a set of zero or more non-root properties, wherein each non-root property has a property name and a property value;
comparing the first object notation document to the second object notation document to generate the delta object notation document in an object notation format, including:
navigating properties in the first object notation document and the second object notation document to identify properties in the first object notation document and the second object notation document;
determining, for each property identified in the first object notation document or the second object notation document, whether a property with a same name and parent exists in a corresponding first object notation document or a corresponding second object notation document;
in response to determining, for an identified property, that a property with a same name and parent does not exist in the corresponding first object notation document or the corresponding second object notation document:
generating a property-change-operation property, in the object notation format, that indicates a difference between the first object notation document and the second object notation document with respect to the identified property, wherein the property-change-operation property indicates a change to an array included in the first object notation document; and
including the property-change-operation property in the delta object notation document; and
providing the delta object notation document in response to the request.

17. The system of claim 16, wherein the object notation format is JSON (JavaScript Object Notation).

18. A computer program product encoded on a non-transitory storage medium, the product comprising non-transitory, computer readable instructions for causing one or more processors to perform operations comprising:
receiving a request to create a delta object notation document based on a first object notation document and a second object notation document, wherein each object notation document has a root property and a set of zero or more non-root properties, wherein each non-root property has a property name and a property value;
comparing the first object notation document to the second object notation document to generate the delta object notation document in an object notation format, including:
navigating properties in the first object notation document and the second object notation document to identify properties in the first object notation document and the second object notation document, wherein navigating includes recursive navigating of nested properties;
determining, for each property identified in the first object notation document or the second object notation document, whether a property with a same name and parent exists in a corresponding first object notation document or a corresponding second object notation document;
in response to determining, for an identified property, that a property with a same name and parent does not exist in the corresponding first object notation document or the corresponding second object notation document:
generating a property-change-operation property, in the object notation format, that indicates a difference between the first object notation document and the second object notation document with respect to the identified property; and
including the property-change-operation property in the delta object notation document; and
providing the delta object notation document in response to the request.

19. A computer program product encoded on a non-transitory storage medium, the product comprising non-transitory, computer readable instructions for causing one or more processors to perform operations comprising:
receiving a request to create a delta object notation document based on a first object notation document and a second object notation document, wherein each object notation document has a root property and a set of zero or more non-root properties, wherein each non-root property has a property name and a property value;
comparing the first object notation document to the second object notation document to generate the delta object notation document in an object notation format, including:

navigating properties in the first object notation document and the second object notation document to identify properties in the first object notation document and the second object notation document;

determining, for each property identified in the first object notation document or the second object notation document, whether a property with a same name and parent exists in a corresponding first object notation document or a corresponding second object notation document;

in response to determining, for an identified property, that a property with a same name and parent does not exist in the corresponding first object notation document or the corresponding second object notation document:

generating a property-change-operation property, in the object notation format, that indicates a difference between the first object notation document and the second object notation document with respect to the identified property; and including the property-change-operation property in the delta object notation document;

providing the delta object notation document in response to the request;

applying the delta object notation document to the first object notation document to produce the second object notation document;

including, in the delta object notation document, a hash value generated based on the first object notation document; and using the hash value to verify that the delta object notation document was generated based on the first object notation document, before applying the delta object notation document to the first object notation document.

* * * * *